Patented Nov. 14, 1950

2,529,838

UNITED STATES PATENT OFFICE 2,529,838

PREPARATION OF N,N-DIALKYLACRYL-AMIDES

John G. Erickson, Greenwich, Conn., assignor to American Cyanamid Company, New York, N. Y., a corporation of Maine No Drawing. Application September 23, 1948,
Serial No. 50,890

3 Claims. (Cl. 260—561)

The present invention relates to the preparation of N,N-dialkylacrylamides.

It is an object of the present invention to prepare N,N-dialkylacrylamides; and more particularly, to prepare N,N-dialkylacrylamides in which the alkyl groups contain five or more carbon atoms, by heating an acrylic ester and the corresponding dialkylamine. Other objects will be apparent from the following discussion of the invention.

In the reaction of dialkylamines with an acrylic ester in an autoclave under heat and pressure, the surprising discovery has been made that when the alkyl groups contain five or more carbon atoms the result of the reaction is an N,N-dialkylacrylamide, and that no N,N-dialkylacrylamide is obtained unless each alkyl group of the dialkylamine contains at least five carbon atoms.

The N,N-dialkylacrylamides are useful as resin intermediates and for other purposes.

The invention is illustrated by the following example.

EXAMPLE 1

*N,N-di(2-ethylhexyl) acrylamide*

43 parts by weight of methyl acrylate was heated with 120.5 parts of di-2-ethylhexylamine and 1 part of hydroquinone for 10 hours at 250° C., yielding an impure mixture comprising N,N-di(2-ethylhexyl) acrylamide, which was distilled to give 26.8 parts of pure N,N-di(2-ethylhexyl) acrylamide, a liquid boiling at 131°–135° C. under 0.5 mm. pressure.

As examples of dialkylamines that are satisfactory for use in this invention, the following are cited: diamyl amine, dihexyl amine, diheptyl amine, didodecyl amine, diisoamyl amine, di-3-methylnonyl amine, amyl,2-ethylhexyl amine, hexyldodecyl amine.

The acrylates suitable for use in this invention are available in the aliphatic, alkaryl, aralkyl, aryl, heterocyclic esters such as: methyl acrylate, ethyl acrylate, butyl acrylate, isobutyl acrylate, beta-methoxyethyl acrylate, benzyl acrylate, phenethyl acrylate, phenyl acrylate, beta-naphthyl acrylate, 2-thienyl acrylate.

No definite proportions are necessary, although it is preferred to use about one mole of ester to two moles of amine. Polymerization will be reduced if the reaction is conducted in the presence of a small amount of polymerization inhibitor such as hydroquinone, catechol, tertiary butyl catechol, p-aminophenol, or the like. The invention contemplates an autoclave temperature of at least 150° C. and a reaction time of at least one hour. The upper temperature limit varies both with the duration of the reaction and the particular amine and acrylic compounds employed. The amines and acrylic compounds of increasing molecular weight require longer reaction times. As a general rule, temperatures in the proximity of 400° C. can be employed only when the time of reaction is relatively brief, i. e., usually not more than fifteen minutes.

While the invention has been described with particular reference to specific embodiments, it is to be understood that it is not to be limited thereto but is to be construed broadly and restricted solely by the scope of the appended claims.

I claim:

1. The method comprising heating an amine of the formula $R_2NH$, in which R is an alkyl radical containing at least five carbon atoms, with a monomeric acrylic ester free from interfering substituents under superatmospheric pressure to produce the corresponding N,N-dialkylacrylamide.

2. The method comprising heating an amine of the formula $R_2NH$, in which R is an alkyl radical containing at least five carbon atoms, with a monomeric acrylic ester free from interfering substituents under superatmospheric pressure for a time and temperature ranging from about 1 hour at about 150° C. to about 15 minutes at about 400° C. to produce the corresponding N,N-dialkylacrylamide.

3. The method of making N,N-di(2-ethylhexyl) acrylamide comprising heating a mixture substantially comprising methyl acrylate and di-2-ethylhexylamine in a closed reaction zone for a time and temperature ranging from about 1 hour at 150° C. to about 15 minutes at about 400° C. to produce N,N-di(2-ethylhexyl) acrylamide.

JOHN G. ERICKSON.

REFERENCES CITED

The following references are of record in the file of this patent:

UNITED STATES PATENTS

| Number | Name | Date |
|---|---|---|
| 2,146,209 | Graves | Feb. 7, 1939 |
| 2,387,501 | Dietrich | Oct. 23, 1945 |
| 2,401,885 | Semon | July 11, 1946 |
| 2,451,436 | Erickson | Oct. 12, 1948 |